United States Patent [19]
Karageozian et al.

[11] 3,910,296
[45] Oct. 7, 1975

[54] METHOD OF REMOVING PROTEINACEOUS DEPOSITS FROM CONTACT LENSES

[75] Inventors: Hampar L. Karageozian, Laguna Hills; Paul Rudko, Huntington Beach, both of Calif.

[73] Assignee: Allergan Pharmaceuticals, Irvine, Calif.

[22] Filed: Mar. 4, 1974

[21] Appl. No.: 447,744

Related U.S. Application Data

[63] Continuation-in-part of Ser. No. 352,861, April 20, 1973, abandoned.

[52] U.S. Cl. ............... 134/2; 134/42; 252/DIG. 12
[51] Int. Cl.² ................................... B08B 3/08
[58] Field of Search ........... 264/1; 195/4, 2; 134/2, 134/26, 42; 424/94; 351/160; 252/527, DIG. 12

[56] References Cited
UNITED STATES PATENTS

| | | |
|---|---|---|
| 2,676,138 | 4/1954 | Hinkel .................... 252/DIG. 12 |
| 2,936,265 | 5/1960 | Whitehill et al. .................. 195/2 X |
| 3,171,752 | 3/1965 | Rankin........................... 424/329 X |
| 3,296,094 | 1/1967 | Cayle......................... 252/DIG. 12 |
| 3,825,498 | 7/1974 | Altenschopfer et al. ..... 252/DIG. 12 |

OTHER PUBLICATIONS

Trager, "Solutions For Soft Lenses," Manufacturing Optics International, May 1972, pp. 403–405.
Gassett, Soft Contact Lenses, Proceedings of the Symposium and Workshop of the U. of Fla., C. V. Mosby Co., 1972, pp. 247–253.
Obrig et al., Contact Lenses, 3rd Ed., New York, 1957, pp. 341–343.

*Primary Examiner*—S. Leon Bashore
*Assistant Examiner*—Marc L. Caroff
*Attorney, Agent, or Firm*—Martin A. Voet

[57] ABSTRACT

Proteinaceous material on the surface of contact lenses, especially soft contact lenses, may be removed by contacting the lens for a time sufficient to clean the lens with a substantially isotonic, aqueous solution containing an effective amount of a protease such as papain.

12 Claims, 19 Drawing Figures

PROTEIN DEPOSITED LENS (LABORATORY MODEL)

INSIDE SURFACE - 500X

*Fig. 2a*

INSIDE SURFACE - 2000X

*Fig. 2b*

OUTSIDE SURFACE - 500X

*Fig. 2c*

OUTSIDE SURFACE - 2000X

*Fig. 2d*

PROTEIN DEPOSITED LENS (HUMAN WORN)

INSIDE SURFACE - 500X

*fig. 3a*

INSIDE SURFACE - 2000X

*fig. 3b*

OUTSIDE SURFACE - 500X

*fig. 3c*

OUTSIDE SURFACE - 2000X

*fig. 3d*

LABORATORY MODEL LENS AFTER CLEANING

INSIDE SURFACE - 500X

Fig. 4a

INSIDE SURFACE - 2000X

Fig. 4b

OUTSIDE SURFACE - 500X

Fig. 4c

OUTSIDE SURFACE - 2000X

Fig. 4d

HUMAN WORN LENS AFTER CLEANING

INSIDE SURFACE -500X fig.5a

INSIDE SURFACE -2000X fig.5b

OUTSIDE SURFACE -500X fig.5c

OUTSIDE SURFACE -2000X fig.5d

METHOD OF REMOVING PROTEINACEOUS DEPOSITS FROM CONTACT LENSES

REFERENCE TO PRIOR APPLICATIONS

This application is a continuation-in-part of U.S. Ser. No. 352,861 filed Apr. 20, 1973, now abandoned.

BACKGROUND OF THE INVENTION

Hydrophilic or partially hydrophilic plastic materials have been described for use in making so called soft contact lenses. For example, U.S. Pat. No. 3,503,393 to Seiderman and U.S. Pat. No. 2,976,576 to Wichterle describe processes for producing three dimensional hydrophilic polymers of polyhydroxyethylmethacrylate in aqueous reaction media having a sparingly cross-linked polymeric hydrogel structure and having the appearance of elastic, soft, transparent hydrogels. Other soft contact lenses include lenses made out of silicone and other optically suitable flexible materials.

The main virtues of these lenses is their softness and optical suitability. The hydrophilic lenses are particularly useful in ophthalmology due to their remarkable ability to absorb water with a concomitant swelling to a soft mass of extremely good mechanical strength, complete transparency and the ability to retain shape and dimensions when equilibrated in a given fluid.

One of the problems connected with these soft contact lenses is the method of their cleaning. The very property of the hydrophilic soft lenses which allows them to absorb up to 150 per cent by weight of water also allows formulations which might otherwise be used for cleaning to be absorbed and even concentrated and later released when the soft contact lens is on the eye. The release may be much slower than the uptake; therefore the cleaner continues to build-up in the lenses. This build-up eventually effects the physical characteristics of the lenses including dimension, color, etc. This can have the harmful result of damaging or staining the contact lens itself and/or harming the sensitive tissues of the conjunctivae or cornea.

Hard contact lenses do not absorb appreciable amounts of water (i.e., 0.1–0.4%) and thus the use of effective preservatives does not create a problem in the hard contact lens field. As stated in the medical publication "Highlights of Ophthalmology", Vol. XII, Nov. 3, 1969, sterilizataion and cleaning of soft contact lenses is presently carried out by boiling the lenses in water for 15 minutes; a rather inconvenient and dangerous operation. Furthermore, users of soft contact lenses are warned that under no circumstances should solutions designed for hard contact lenses be used, for the reason that the materials in such solutions may be absorbed and even concentrated by the soft lens and may seriously damage the soft lens and/or the eye of the user.

A second problem connectd with the soft contact lenses has now been discovered. It has been found that opaque or partially opaque materials were depositing on the surface of the soft contact lenses. This attachment of material is firm and cannot be removed by conventional cleaning methods which will not otherwise injure the lens or the eye of the wearer of the lens, e.g. soaking or boiling in normal saline. The build-up of material is gradual, though ultimately rendering the lens opaque. Furthermore, even before the lens becomes opaque, the wearer of the lens finds that the lens becomes increasingly more uncomfortable to wear due to increasing irritation to the eye caused by the gradual build-up on the surface of the lens.

Lysozyme is an enzyme having an isoelectric point (pI) of 11. That is, at pH 11, a molecule of lysozyme is neutrally charged. At pH below, 11, lysozyme is positively charged and at a pH above 11, lysozyme is negatively charged. At the pH of human tears, i.e., pH 6.5 – 7.5, lysozyme is strongly positively charged. The basic nature of lysozyme is due to the number of basic amino acids in its structure, the most basic of which is arginine.

SUMMARY OF THE INVENTION

Proteinaceous material on the surface of contact lenses especially soft contact lenses, may be removed by contacting the lens for a time sufficient to clean the lens with a substantially isotonic, aqueous solution containing an effective amount of a protease.

The present invention also relates to a protease containing composition suitable for removing proteinaceous materials from contact lenses.

BRIEF DESCRIPTION OF DRAWINGS

FIG. 2 (A,B,C,D) are photomicrographs of portions of the inside and outside surfaces of a soft contact lens coated with protein by a laboratory method.

FIG. 3 (A,B,C,D) are photomicrographs of portions of the inside and outside surfaces of a soft contact lens coated with human produced protein.

FIG. 4 (A,B,C,D) are photomicrographs of corresponding portions of the inside and outside surfaces of the soft contact lens in FIG. 2 (A,B,C,D) which have been cleaned by the present invention.

FIG. 5 (A,B,C,D) are photomicrographs of corresponding portions of the inside and outside surfaces of the soft contact lens shown in FIG. 3 (A,B,C,D) which have been cleaned by the present invention.

DETAILED DESCRIPTION OF THE INVENTION

The proteases which may be used in the present invention are those proteolytic enzymes which do not effect the soft lenses and which are non-toxic to the eyes of the user of the lens. The preferred proteolytic enzyme is papain. Other suitable proteolytic enzymes include trypsin, chymo-trypsin, streptokinase, streptodornase, ficin, pepsin, carboxypeptidase, aminopeptidase, chymopapain, bromelin and other proteolytic enzymes.

The amount of protease which should be used in the present invention varies from about 0.01 to about 5 percent and preferably about 0.05 to about 1.0 percent.

The preferred formulation consists of a substantially isotonic, aqueous solution that contains papain stabilized in lactose (Prolase 300) with cysteine hydrochloride monohydrate and disodium edetate in a saline and phosphate base.

Papain is an enzyme derived from the native green fruit of the tropical papaw or melon tree (*Carica papaya*) whose clear watery fluid is collected, dried, powdered, and sieved to produce the papain. It is an enzyme silimar to pepsin but acts in acid, alkaline or neutral solution. It is white to gray powder and is moderately hygroscopic. It dissolves about 200 times its weight of coagulated egg albumin in alkaline liquid in about 5 hrs. It is very soluble in water and glycerine but almost insoluble in alcohol.

Prolase 300 [R] protease is commercially available and contains the activated and refined proteolytic enzymes derived from the tropical plant *Carica papaya*. Prolase 300 [R] is supplied as a light tan-colored powder of uniform potency. Each gram of Prolase 300 [R] contains 300 Wallerstein Papain Activity units as determined either by a milk clotting assay method or by a casein digestion method.

Figure 1A:
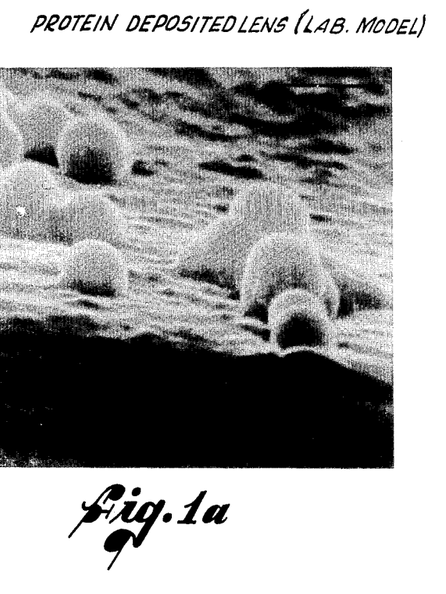
FIG. 1(A) is a photomicrograph of a cross section of soft contact lens coated with protein by a laboratory method.
Figure 1B:
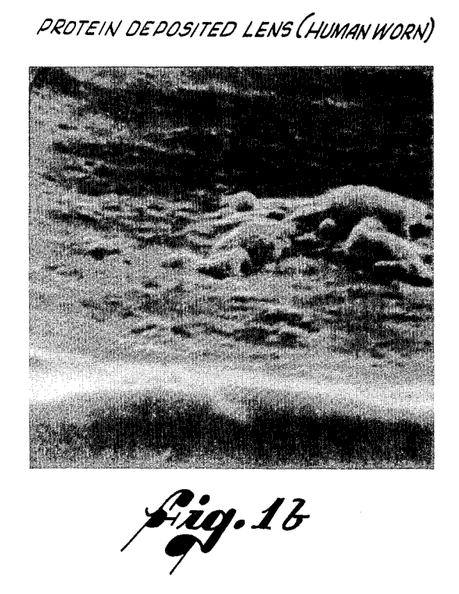
FIG. 1(B) is a photomicrograph of a cross section of a soft contact lens coated with human produced protein.
Figure 2A:
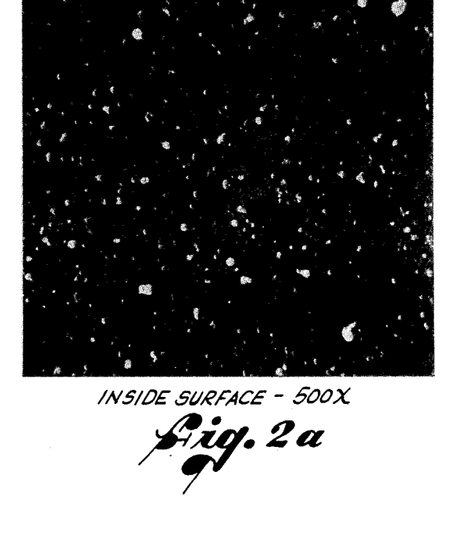
Figure 2B:
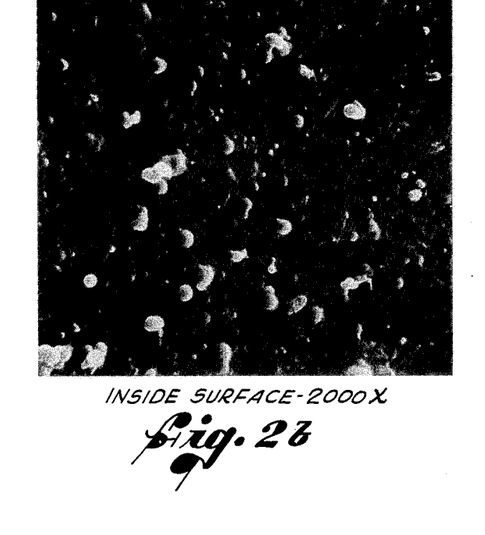
Figure 2C:
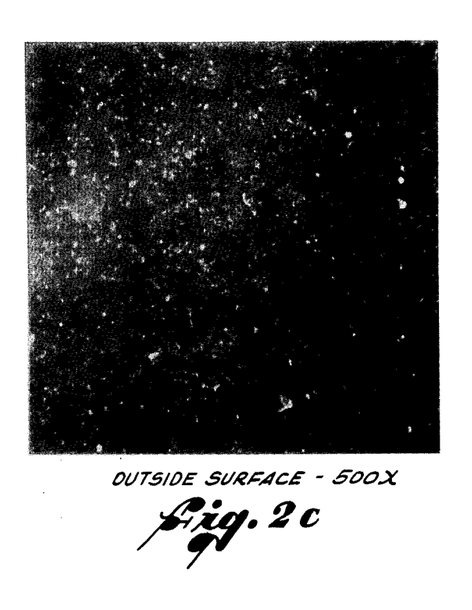
Figure 2D:
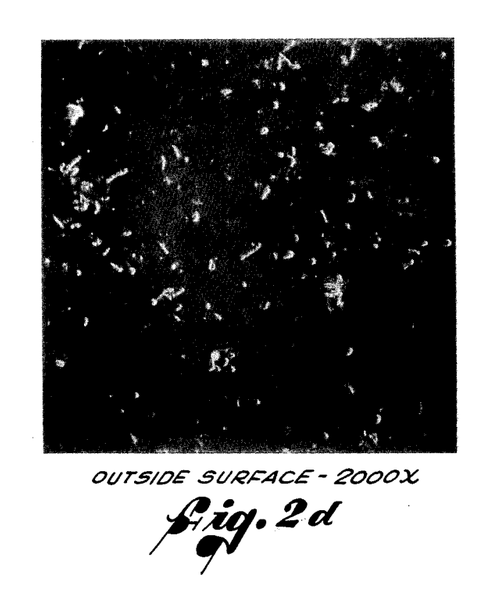
Figure 3A:
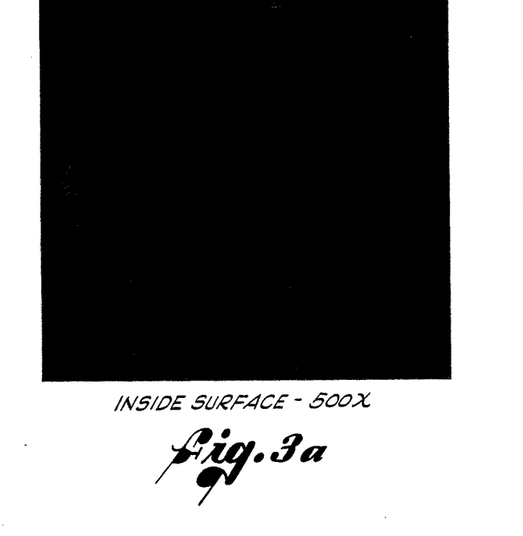
Figure 3B:
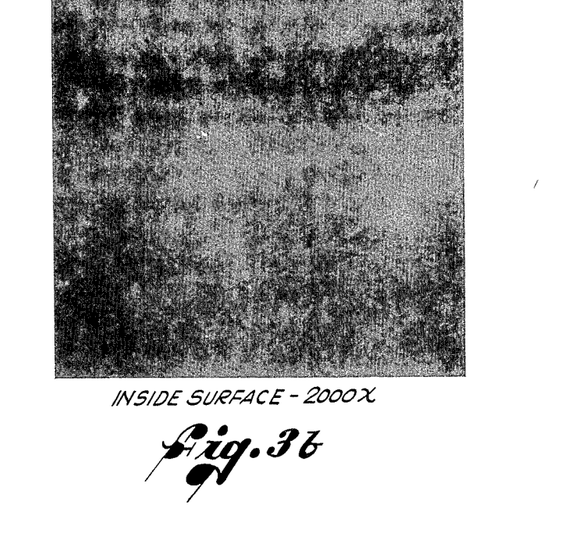
Figure 3C:
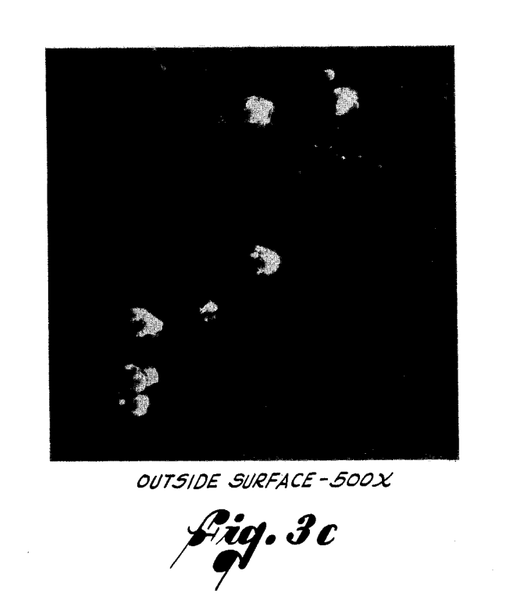
Figure 3D:
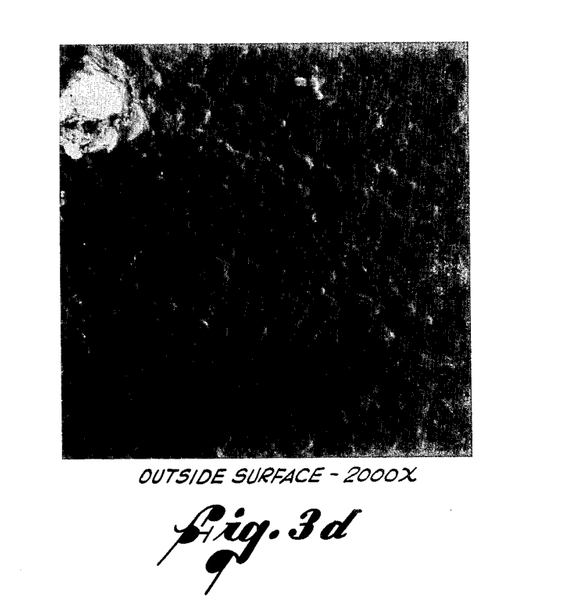
Figure 4A:
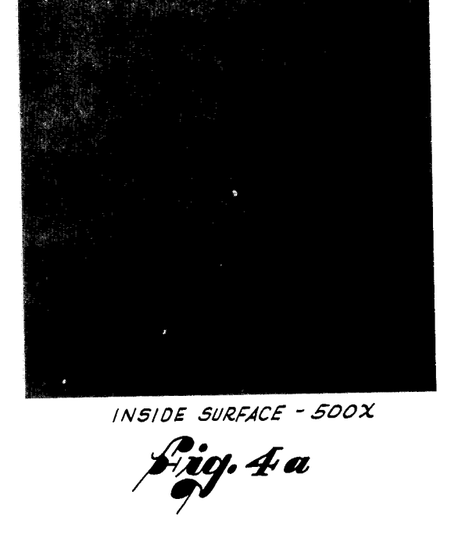
Figure 4B:
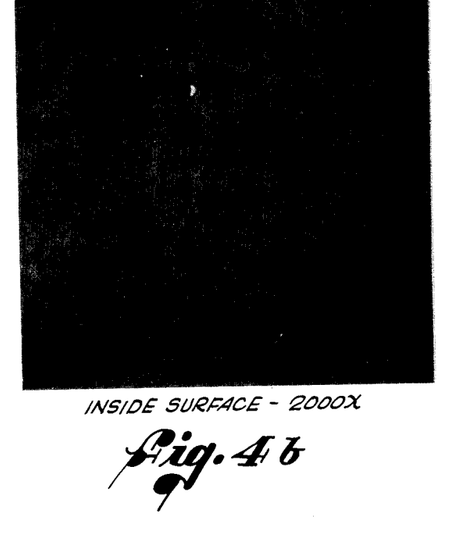
Figure 4C:
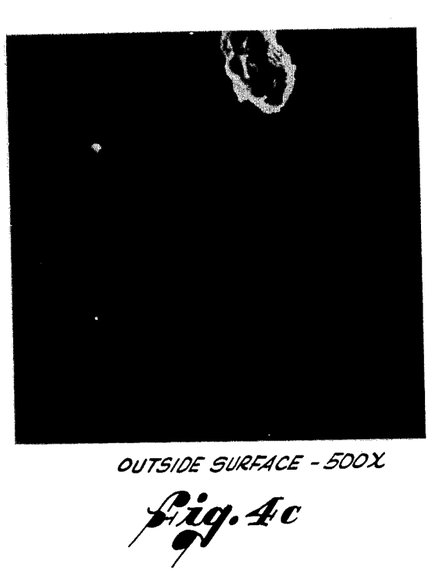
Figure 4D:
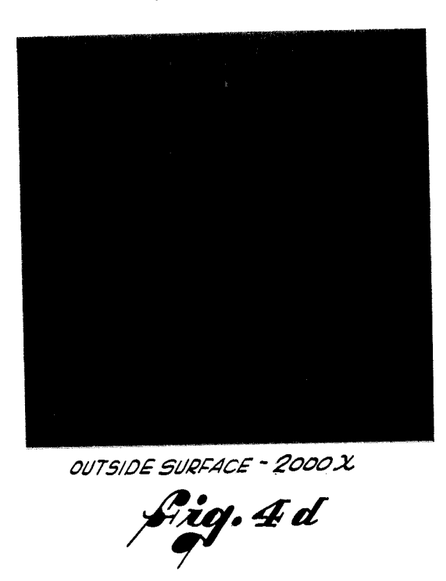
Figure 5A:
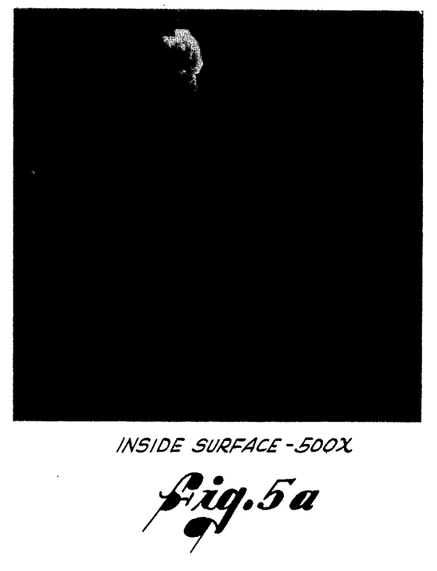
Figure 5B:
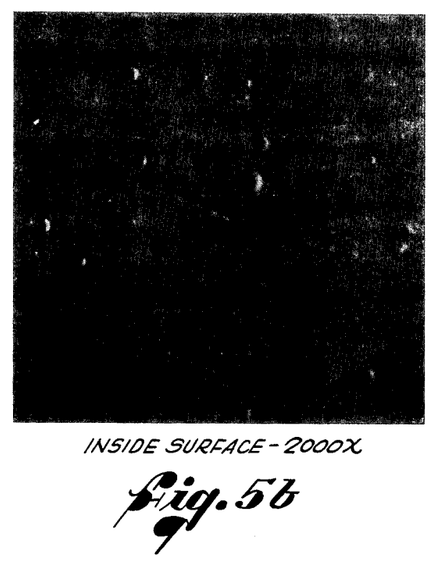
Figure 5C:
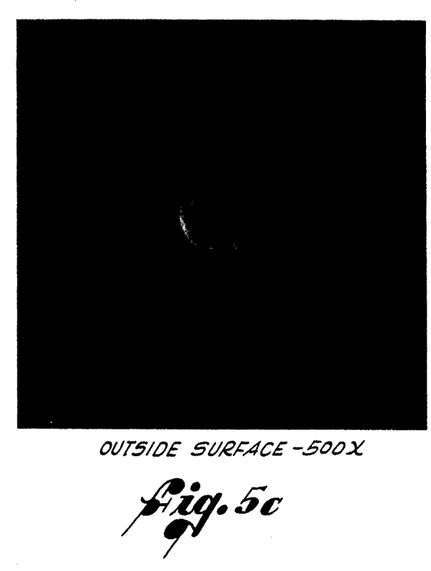
Figure 5D:
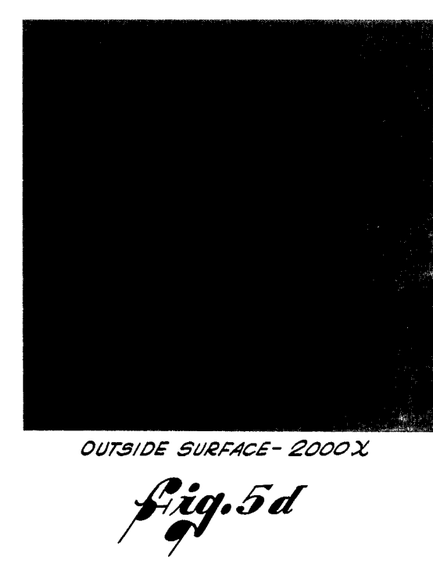

Referring now in more detail to the drawings, FIGS. 1(A) and (B) are scanning electron micrographs (20,000X) of cross sections of Bausch & Lomb soft contact lenses. The lens shown in FIG. 1(A) has been coated by the procedure of EXAMPLE 1 with lysozyme; the lens shown in FIG. 1(B) is a human worn lens. The micrographs were taken by cross sectioning the lenses and applying a vacuum evaporated metal coating. Micrographs were made of the cut edge of the lenses, approximately perpendicular to the plane of the lens, using a Cambridge scanning electron microscope.

The lysozyme coated lens shown in FIG. 1(A) has a definite layer of protein bound to its surface. The thickness of the layer averaged 0.25 microns over the area observed. Large hemispherical particles about 0.7 micron in diameter were observed embedded in the surface layer.

The surface of the human worn lens shown in FIG. 1(B) does not show the layer of protein as dramatically as the lysozyme coated lens. The presence of the layer was observed visually on the Cathode ray tube display, but the layer fused to the lens polymer due to heating by the electron beam before a picture could be taken. The surface layer does, however, show some spherical particles having a diameter of about 0.3 microns.

FIG. 2(A,B,C,D) are photographs at 500X and 2000X of the inside and outside surfaces of a section of Bausch & Lomb soft contact lens which has been deposited with lysozyme by the method of EXAMPLE I. The presence of the lysozyme layer is fairly apparent.

FIG. 3(A,B,C,D) are similar to FIG. 2(A,B,C,D) except that the soft lenses were human worn and thus the deposits are human protein deposits. The presence of the protein layer is less apparent than that of FIG. 2, but the coating is nonetheless seen, especially on the outside surface of the lens at 2000X.

FIG. 4 (A, B, C, D) are photographs at 500X and 2000X of the inside and outside surfaces of portions of the same lens shown in FIG. 2, except that the portion shown in FIG. 4 has been previously cleaned using the method shown in EXAMPLE VII. The lens was cleaned for 48 hours. The large white puff in the center-top of FIG. 4C is a stray fiber introduced during the process of sample preparation.

FIG. 5 (A,B,C,D) are photographs at 500X and 2000X of the inside and outside surfaces of portions of the same lens shown in FIG. 3, except that the portion shown in FIG. 5 has been previously cleaned according to EXAMPLE VII. The lens was cleaned for 48 hours.

As is apparent from a comparison of FIGS. 2 and 4 and FIGS. 3 and 5, the present invention effectively cleans the proteinaceous deposits from the lenses, both laboratory coated and human worn lenses.

Figure 6:
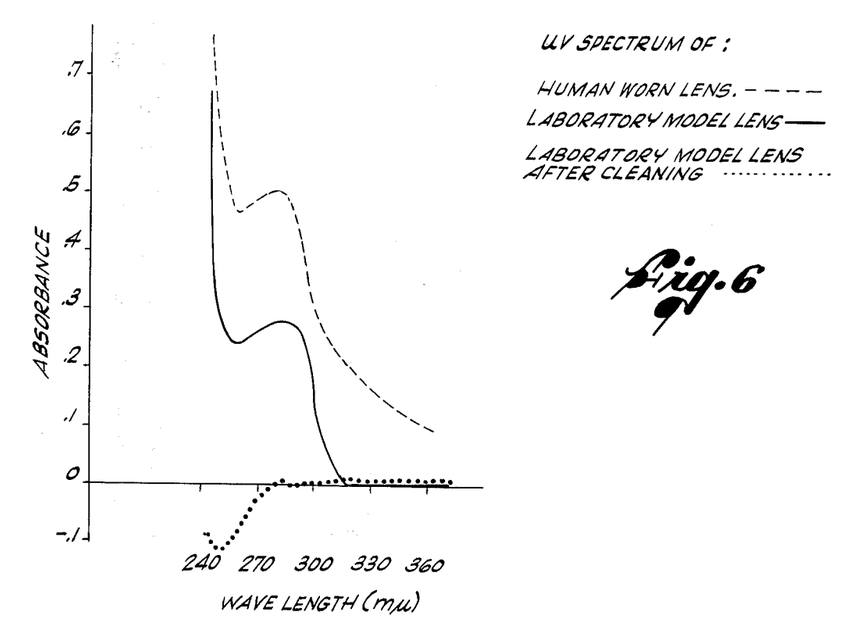
FIG. 6 is a graph comparing the ultraviolet spectra of a lysozyme coated soft contact lens with a human protein coated soft contact lens and the latter after cleaning by the present invention.

FIG. 6 shows the ultraviolet spectrum of a Bausch & Lomb soft contact lens coated with lysozyme by the method of EXAMPLE I. The spectrum was taken vs a reference soft lens to show only the spectrum of the deposit. FIG. 6 also shows the ultraviolet spectrum of a Bausch & Lomb soft contact lens which has been human worn and which had protein deposits similarly taken vs a reference soft lens. The curves are remarkably similar indicating that the human deposited protein is quite similar to the lysozyme deposit. FIG. 6 further shows an ultraviolet spectrum of the above described laboratory model lens which was cleaned by the method of EXAMPLE VI.

A typical composition of the present invention may contain, in addition to the active ingredients described earlier, lubricants to aid in making the ophthalmic cleaning composition more comfortable to the user.

Suitable buffers and stabilizers may also be used and include sodium or potassium citrate, citric acid, boric acid, $Na_2EDTA$, various mixed phosphate buffers and $NaHCO_3$. Generally buffers and stabilizers may be used in amounts ranging from about 0.001 to about 2.5% and preferably about 0.01 to 1% by weight.

Furthermore, non-toxic agents suitable for use in sterilizing soft contact lenses may also be used in combination with the protease formulations of the present invention.

It has also been discovered that the effectiveness of the protease may be enhanced by the use of a non-toxic sulfahydryl group-containing compound. Suitable sulfahydryl containing activating compounds include cysteine hydrochloride, dithiothreitol, dithioerythritol, sodium bisulfite, sodium metabisulfite and thiourea. Generally, activators may be used in amounts ranging from about 0.01 – 5% and preferably from about 0.05 – 1.0% by weight.

The treating solution for contact lenses is generally maintained at physiological saline, i.e., substantially isotonic, or approximately 0.9% saline, or with suitable agents alone or in combination to render the solution substantially isotonic. Hyptonic solution, e.g., tap water, will cause the lens to adhere tightly to the cornea while hypertonic solutions (excess saline) will result in stinging, lacrimation and a red eye.

It should be understood that the foregoing description of the amounts of the various compounds which may be used in the present invention are stated in percentage of ingredients in solution. The formulation may also take the form of one or more conventional solid dosage forms such as tablets suitable for use in a measured quantity of a suitable solvent such as water. The percentage composition of the solid dosage forms is such that when dissolved in a specified volume of water, the solution will have the percentage composition within the ranges set forth in the specification. If solid dosage forms are used, the formulation may include conventional lubricants, binders, and excipients which include glycerol, sorbitol, boric acid, propylene glycol, polyethylene glycols, dextran, methylcellulose, hydroxyethylcellulose, water soluble salts of carboxymethylcellulose, or naturally occurring hydrophilics such as gelatin, alginates, tragacanth, pectin, acacia and soluble starches. These materials are used in amounts varying between 0.01 and 10 and preferably between 0.1 and 5 weight percent. A tablet which may be used herein contains the ingredients set forth in Example VII (under the heading "Tablet"). The tablet may be combined with water in approximately the proportions stated in a ratio of about 25–250 mg of composition for every 10 ml water.

The method of use of the cleaning solution is the following. The wearer of the soft contact lenses removes them from his eyes and places them in a suitable container with sufficient amount of the composition of the present invention to cover the lenses. The lenses are allowed to soak for a period of about one minute to about 48 hours and preferably about 1 minute to about 24 hours at room temperature, or for shorter periods at elevated temperatures, e.g. about ½ to 6 hours at 37°C.

To illustrate the manner in which the invention may be carried out, the following examples are given. It is understood, however, that the examples are for the purposes of illustration and the invention is not to be regarded as limited to any of the specific materials or conditions set forth therein. Unless otherwise stated "%" means %(w/v). Soft contact lenses used were Bausch & Lomb Soflens, unless otherwise indicated.

The rating system devised for specifying the nature of any deposits found on the soft lenses was as follows: If no deposits were visible to the naked eye, the lens was considered to be acceptable. Some "acceptable" lenses had deposits which could be seen under a microscope, but these deposits were not considered significant. If deposits were somewhat visible to the naked eye, and clearly discernible by microscope, the lens was considered to be Type III and potentially harmful. If deposits were clearly visible to the naked eye, the lens was considered Type IV. Type IV lenses were considered to be harmful. In addition, if up to but less than ¼ of the lens surface had deposits, the lens was described as "A". Similarly, the lens was described as a "B" if up to but less than ½ of the lens surface had deposits, "C" if up to, but less than ¾ of the lens surface had deposits and "D" if more than ¾ of the lens surface had deposits.

EXAMPLE I

To test the hypothesis that lysozyme or lysozyme-like protein was causing the opaque deposits on the soft contact lenses, a laboratory model was developed. A protein solution having a pH of 7.4 was used, as follows:

Protein Solution
0.1% hen-white lysozyme
0.23% $NaH_2PO_4H_2O$
1.15% $Na_2HPO_4$
0.28% NaCl
to 100.00% $H_2O$ Six clean polyhydroxyethylmethacrylate (Bausch & Lomb "Soflens") soft contact lenses were boiled in the protein solution for ½ hour. The lenses were then removed and inspected. All six lenses were found to be coated with a thick Type IV deposit.

EXAMPLE II

Six clean polyhydroxyethylmethacrylate (Bausch & Lomb "Soflens") soft contact lenses were boiled in 0.9% saline for ½ hours. The lenses were then removed and allowed to soak in the Protein Solution of EXAMPLE I. The cycle was repeated as indicated and the lenses were inspected for deposits.

The results of EXAMPLE II are tabulated below in Table 1.

Table 1

| Cycles | Acceptable | No. of lenses which were: III | | | | IV | | | |
|---|---|---|---|---|---|---|---|---|---|
| | | A | B | C | D | A | B | C | D |
| 0 | 6 | — | — | — | — | — | — | — | — |
| 6 | 5 | — | — | 1 | — | — | — | — | — |
| 11 | 4 | — | 1 | 1 | — | — | — | — | — |
| 16 | 4 | — | — | 1 | — | — | — | 1 | — |
| 20 | 4 | — | — | 1 | — | — | — | 1 | — |
| 25 | 4 | — | — | — | — | 1 | — | 1 | — |
| 49 | 2 | 1 | — | 1 | — | — | — | 1 | 1 |

The foregoing EXAMPLE II indicates the laboratory model deposits protein on the soft lenses within six cycles. Subsequent cycles generally show heavier deposits forming.

EXAMPLE III

EXAMPLE I was repeated except two soft lenses were used and the Protein Solution did not contain phosphate buffer. Both lenses were found to be coated with a thick Type IV deposit.

EXAMPLE IV

EXAMPLE IV describes the procedures used to determine the chemical nature of the white opaque film found on the soft contact lenses. A conventional amino acid analyzer was used. The soft contact lenses used herein were Bausch & Lomb "Soflens" and comprised (1) seven human worn lenses, (2) seven rabbit worn lenses, and (3) four laboratory produced lenses, all of which had heavy opaque deposits on their surfaces. The deposits were produced in humans and rabbits by having the lenses worn by the respective subjects over a period of two or four weeks for 6–7 hours/day. The lenses were soaked in 0.9% saline overnight between wearings. The opaque deposits on the four laboratory produced lenses were made by the procedure of EXAMPLE I.

ACID HYDROLYSIS

Four human worn lenses (Sample A), four rabbit worn soft lenses (Sample B), and two laboratory model processed soft lenses (Sample C) were all placed respectively in 10 ml glass ampules. 10 ml of 6N hydrochloric acid was added to each ampule, the contents of each ampule was frozen using an acetone-dry ice bath. The ampules were flushed with nitrogen and sealed. The ampules were placed in an oven at 100°C and maintained at that temperature for 48 hours. After the 48 hours of acid hydrolysis, the hydrochloric acid solutions were evaporated to dryness, respectively. The dried samples were redissolved in a total volume of 1.0 ml citrate buffer pH-2.0. The samples were injected into the amino acid analyzer in the conventional manner and the results tabulated.

BASIC HYDROLYSIS

Three human worn soft lenses (Sample D), three rabbit worn soft lenses (Sample E), and two laboratory model processed soft lenses (Sample F) were all placed respectively in 10 ml glass ampules. 10 ml of 6.5% barium hydroxide solution was added to each ampule, the contents of each ampule was frozen using an acetone-dry ice bath. The ampules were flushed with nitrogen and sealed. The ampules were incubated for a period of 48 hours at 100°C. The cooled reaction mixture was adjusted to pH = 6.0 with 2N sulfuric acid, heated to boiling and centrifuged to separate barium sulfate. The supernatant liquid and washings were evaporated to dryness and the residue dissolved in 2 ml of citrate buffer pH-2.0. The samples were injected into the analyzer in the conventional manner, and the results tabulated.

Table 2 below tabulates the results of the foregoing analyses on the opaque deposits on the human, rabbit and laboratory-produced lenses and compares the results to published data on human tear lysozyme (J. Lab and Clin. Med., December 1967 pp. 951–952) and hen-white lysozyme (Biken Journal, Vol. 9, pp. 107–114, 1966).

Table 2 shows that, as expected, the amino acid ra-

Table 2

Ratios of Amino Acids Found in Soft Contact Lens Deposits Compared with Published Ratios of Amino Acids in Human and Hen-White Lysozyme

| Amino Acids | Published Human Tear Lysozyme | Human Lens Deposit | Published Hen-White Lysozyme | Hen-White Lysozyme Lab Model Lens | Rabbit Lens Deposit |
|---|---|---|---|---|---|
| Threonine | 6 | 6 | 7 | 7 | 7 |
| Serine | 7 | 7 | 10 | 10 | 9 |
| Glutamic Acid | 9–10 | 9 | 5 | 5 | 11 |
| Proline | 3 | 5 | 2 | 2 | — |
| Glycine | 11 | 11 | 12 | 12 | 12 |
| Alanine | 12–13 | 10–11 | 12 | 12 | 6 |
| Half Cystine | 6 | — | 8 | — | — |
| Valine | 8 | 6 | 6 | 6 | 6 |
| Methionine | 2 | — | 2 | — | — |
| Isoleucine | 5 | 3–4 | 6 | 6 | 4 |
| Leucine | 8 | 7 | 8 | 8 | 7 |
| Tyrosine | 5 | 4 | 3 | 3 | — |
| Phenylalanine | 2 | 3 | 3 | 3 | 7 |
| Histidine | 1 | 1 | 1 | 1 | 2 |
| Lysine | 5 | 2 | 5 | 5 | 4 |
| Arginine | 11–12 | 10–11 | 11 | 11 | 9 |
| Tryptophane | — | — | — | — | — |
| Aspartic Acid | — | — | — | — | — | tios of the protein deposited on the soft lenses utilizing the laboratory model compares very closely with the amino acid ratio of published hen-white lysozyme. This would be expected because the laboratory model utilized hen-white lysozyme to coat the lenses.

Table 2 also shows that the amino acid ratio of human soft lens protein compares very closely with the amino acid ratio of published human tear lysozyme inferring very strongly that the protein which is deposited on human worn lenses is lysozyme or a lysozyme-like protein.

The results shown in Table 2 also clearly show the nature of the opaque thin deposits which accumulate on the soft lenses is a protein which is classified as a basic protein due to the high proportions of lysine and arginine present.

It should be noted that the amino acid ratios of human lens protein compared very favorably with laboratory model lens protein, indicating that the laboratory model as a whole is a very good approximation of human soft lens deposition.

Finally, it should be noted that although the protein deposited in the rabbit model is a basic protein, its properties seem to be quite different in its amino acid composition and ratio from either the human lens protein or laboratory model lens protein.

EXAMPLE V

Six Type IV D lysozyme coated soft contact lenses were rubbed with saline to remove any loose deposits. The lenses were soaked in 5–10 ml of the following enzyme solution at room temperature:
Enzyme Solution
0.1M Sodium Metabisulfite
0.01M Cystine
0.002M Disodium edetate
10 mg/100 ml Papain in purified water The pH of the solution was adjusted to 6.5 with disodium hydrogen phosphate before addition of papain. Two lenses were removed at half hour intervals, rubbed with saline, examimed visually and replaced in the solution. The UV spectrum of a Type IV D lysozyme coated lens vs. a clean lens was obtained. An enzyme solution treated lens was soaked in saline for 24 hours and its UV spectrum was obtained. These spectra were compared to that of a lysozyme solution. The ultraviolet spectra of Type IV D lysozyme coated lens, compared to a lysozyme solution, were very similar. The spectrum of a cleaned lens and a new unused lens similarly showed little absorbance indicating that lysozyme film had been essentially completely removed.

The two lenses which were removed from the enzyme solution periodically for examination began to show clean areas after about three hours. After 20 hours of soaking at room temperature all of the lenses appeared to be acceptable.

EXAMPLE VI 35 human lenses were typed according to the nature of the films present on the lenses. From these 35 lenses, six Type IV D lenses were selected for study. The ultra violet spectra of the lenses were obtained against selected clean reference lenses. A lysozyme coated IV D lens was added as a control. All of the lenses were then soaked for 20 hours in the enzyme solution of EXAMPLE V. The lenses were washed with saline and typed. The UV spectra of the lenses versus the same reference lenses were also determined. The results of the foregoing test was that after cleaning, four out of the six originally IV D lenses were typed "acceptable", one lens was typed IV A and one lens was typed III D. The control was also typed "acceptable" after cleaning. Furthermore, after cleaning the lenses, the UV spectra showed little or no absorbance other than that of the lens itself.

In addition, an ultra-violet spectra of one of the lenses coated with human protein (Lens No. 1) and the lysozyme coated lens (Lens No. 2) were made against a clean reference lens. FIG. 6 compares the results obtained. As is apparent from FIG. 6, the ultra-violet spectrum of the human deposited film is very similar to the ultraviolet spectrum of the lysozyme film. FIG. 6 also shows the UV spectrum of Lens No. 1 after cleaning. Note that the clean lens showed little or no absorbance other than that of the lens itself.

EXAMPLE VII

Nine human protein deposited soft contact lenses were selected as being representative and were allowed to soak in the following Enzyme Solution (pH 7) and were typed hourly. The Enzyme Solution was prepared by adding a Tablet weighing 125 mg containing the following per cent composition to 10 ml of $H_2O$, to produce the indicated Enzyme Solution:

| Enzyme Solution % | Tablet % |
|---|---|
| 0.1 Papain (Prolase 300) | 8.0 Papain (Prolase 300) |
| 0.1 Cysteine HCl | 8.0 Cysteine HCl |
| 0.02 $KH_2PO_4$ | 1.6 $KH_2PO_4$ |
| 0.2 $NaHCO_3$ | 16.0 $NaHCO_3$ |
| 0.08 $Na_2EDTA$ | 6.4 $Na_2EDTA$ |
| 0.73 NaCl | 58.4 NaCl |
| 0.02 PEG 4000[1] | 1.6 PEG 4000[1] |

Table 3 below tabulates the data obtained.

Table 3

| Lens No. | Initial | 1 | 2 | 3 | 4 | 5 | Hours of Cleaning 6 | 7 | 24 | 48 |
|---|---|---|---|---|---|---|---|---|---|---|
| 1 | IVD | IVC | OK* | OK | OK | OK | OK | OK | OK | OK |
| 2 | IVB, IIIB | IVA, IIIC | IIC | IIIC | IIIC | IIIC | IIIC | IIIC | OK | OK |
| 3 | IVC | IVC | IIIC | IIIC | IIIC | IIIC | IIIC | IIIC | OK | OK |
| 4 | IVD | IVC | IVC | IVC | IVB | IVA | IVA | IVA | OK | OK |
| 5 | IVD | IVD | IVD | IVC | IVC | IVC | IVC | IVC | IVC | IVA |
| 6 | IVD | IVD, IIIB | IVB | IIIA | IIIA | OK | OK | OK | OK | OK |
| 7 | IIIC | IIIC | OK | OK | OK | OK | OK | OK | OK | OK |
| 8 | IVB, IIIB | IVB | OK | OK | OK | OK | OK | OK | OK | OK |
| 9 | IVD | IVC | IVB | IVA | OK | OK | OK | OK | OK | OK |

*OK — acceptable.
1. PEG-4000: Polyethylene glycol having a molecular weight of about 4,000.

Table 3 indicates that the enzyme cleaner acceptably cleaned five out of nine lenses in 6 hours and eight out of nine lenses within 24 hours.

EXAMPLE VIII

Four clean soft contact lenses were placed in the enzyme solution of EXAMPLE VII. Two lenses were removed and analyzed for protease without rinsing or blotting. The remaining two lenses were removed and rinsed briefly under 5–10 ml running deionized water and analyzed for protease. The results of the analysis indicated that approximately 11 and 30 $\mu$g of active protease was found on the non-water rinsed lenses and less than 1 $\mu$g of active protease on each of the water rinsed lenses. Based on the foregoing, it is apparent that the protease does not adhere to the soft contact lens and that a brief rinse with water removes residual traces of protease from the lens.

EXAMPLE IX

To test the effect of prolonged soaking in an enzyme solution, six soft contact lenses were soaked for 60 days of 24 hour soaking in an enzyme solution containing 0.1% Prolase 300. At the end of 60 days, there was found no substantial change in the average diameter of the lenses, and no change in the water content of the lenses and no other visible changes or damage to the lenses.

EXAMPLE X

The enzyme solution of EXAMPLE VII was instilled into the left eyes of nine adult female New Zealand albino rabbits. Three rabbits received 1 drop 4 times a day for 20 days; three rabbits received 2 drops 4 times a day for 20 days and three rabbits received 3 drops 4 times a day for 20 days. The rabbits were examined daily for 25 days. No mucosal irritation or toxicity was noted.

EXAMPLE XI 10 adult female New Zealand albino rabbits were used in the following ocular toxicity test using the enzyme solution of EXAMPLE VII. 24 hours prior to the onset of the study, the experimental and control eyes in all rabbits were stained with 1 drop of 2% fluorescein for observation under U.V. light to ensure normal corneas. This procedure is adhered to on a weekly basis. The scoring of the ocular reactions were based on the method described in "Appraisal of the Safety of Chemicals in Foods, Drugs and Cosmetics", 1965, page 51.

Prior to the initial soak, 12 unused soft contact lenses were boiled twice in normal saline for 30 minutes each time and examined microscopically for physical defects. Ten of the lenses were selected for the study. Each of the 10 unused soft lenses was soaked overnight in 5.0 cc of the enzyme solution. In the morning, they were fitted in the left eyes of 10 adult rabbits for approximately 7 hours wearing time. Each lens is assigned to individual rabbits for the duration of the study. Following each day's wear, the lenses were rinsed with normal saline and placed in clean lens bottles containing a fresh amount of soaking solution. The animals were observed regularly for possible lens rejection and irritation of the eye mucosa.

The soft contact lenses were examined weekly for possible protein deposition. At the end of 133 days, all of the lenses were acceptable and none of the rabbits showed ocular irritation, toxicity or discomfort.

EXAMPLE XII

Eight soft contact lenses made by manufacturers other than Bausch & Lomb were coated with lysozyme by the method of EXAMPLE I and cleaned overnight in the formulation of EXAMPLE VII. All of the lenses were IV D prior to cleaning and acceptable after cleaning.

EXAMPLE XIII

Six soft contact lenses were coated with lysozyme by the method of claim 1. An aqueous solution of 0.05% trypsin in phosphate buffer at pH 8.2 was prepared. Three of the lenses were soaked for 2 hours at room temperature; three of the lenses were soaked for 2 hours at 37°C. All six lenses were acceptable at the end of the 2 hour period. However, it was noted that the lenses cleaned faster at the elevated temperature.

EXAMPLE XIV

EXAMPLE XIII was repeated, except a 0.1% aqueous solution of pepsin in citrate buffer at pH 2.2 was used. Comparable results were obtained.

EXAMPLE XV

EXAMPLE XIII is repeated, except the following proteases are used in place of the trypsin:chymotrypsin, streptokinase, streptodornase, ficin, carboxypeptidase, aminopeptidase, chymopapain and bromelin. Comparable results are obtained.

We claim:

1. A method for removing proteinaceous deposits from contact lenses comprising contacting a contact lens having proteinaceous deposits for a period of time sufficient to clean the lens with an aqueous solution comprising an effective cleaning amount of protease which is non-toxic to the eyes.

2. The method of claim 1 wherein the solution additionally contains a non-toxic amount of a sulfhydryl group-containing compound sufficient to activate the protease.

3. The method of claim 2 wherein the sulfhydryl group-containing compound is selected from the group consisting of cysteine hydrochloride, dithiothreitol, dithioerythritol, sodium bisulfite, sodium metabisulfite and thiourea.

4. The method of claim 1 wherein the protease is papain.

5. The method of claim 1 wherein the contact lens is a soft contact lens.

6. A method for removing proteinaceous deposits from soft contact lenses comprising contacting a soft contact lens having proteinaceous deposits for about 1 minute to about 48 hours with an aqueous solution comprising about 0.01 to about 5 percent of a protease which is non-toxic to the eyes.

7. The method of claim 6 wherein the protease is papain.

8. The method of claim 6 wherein the aqueous solution is isotonic.

9. The method of claim 6 wherein the aqueous solution additionally contains about 0.01 to about 5 percent of a sulfhydryl group-containing compound.

10. The method of claim 9 wherein the sulfhydryl group-containing compound is cysteine hydrochloride.

11. A method for removing proteinaceous deposits from soft contact lenses comprising contacting a soft contact lens having proteinaceous deposits for a time sufficient to clean the lens with an aqueous, isotonic solution comprising about 0.05 to about 1.0 percent papain.

12. The method of claim 11 wherein the solution additionally contains about 0.05 – 1 percent by weight of cysteine hydrochloride.

* * * * *

REEXAMINATION CERTIFICATE (666th)

United States Patent [19]

Karageozian et al.

[11] B1 3,910,296

[45] Certificate Issued Apr. 14, 1987

[54] METHOD OF REMOVING PROTEINACEOUS DEPOSITS FROM CONTACT LENSES

[75] Inventors: Hampar L. Karageozian, Laguna Hills; Paul Rudko, Huntington Beach, both of Calif.

[73] Assignee: Allergan Caribbean, Hormiqueros, P.R.

Reexamination Request
No. 90/000,947, Feb. 3, 1986
No. 90/001,047, Jun. 27, 1986

Reexamination Certificate for:
Patent No.: 3,910,296
Issued: Oct. 7, 1975
Appl. No.: 447,744
Filed: Mar. 4, 1974

Related U.S. Application Data

[63] Continuation-in-part of Ser. No. 352,861, Apr. 20, 1973, abandoned.

[51] Int. Cl.$^4$ .................... B08B 3/08; C03C 23/00
[52] U.S. Cl. ........................................ 134/42; 134/2; 252/527
[58] Field of Search .............. 264/1; 134/2, 26, 42; 424/94; 351/160; 252/527, DIG. 12

[56] References Cited

U.S. PATENT DOCUMENTS

| | | |
|---|---|---|
| 1,133,250 | 3/1915 | Ruthrauff . |
| 1,222,144 | 4/1917 | Ruthrauff . |
| 2,676,138 | 4/1954 | Hinkel, Jr. et al. ............... 195/63 |
| 2,936,265 | 5/1960 | Whitehill et al. ................. 195/62 |
| 2,976,576 | 3/1961 | Wichterle et al. ................. 18/58 |
| 3,171,752 | 3/1965 | Rankin ........................... 106/194 |
| 3,194,738 | 7/1965 | Harrisson et al. ................ 167/93 |
| 3,220,960 | 11/1965 | Wichterle et al. ................ 260/2.5 |
| 3,235,460 | 2/1966 | Ennever ............................ 167/93 |
| 3,278,390 | 10/1966 | Arthur ................................ 195/2 |
| 3,296,094 | 1/1967 | Cayle ................................ 195/63 |
| 3,519,379 | 7/1970 | Blomeyer ........................... 8/111 |
| 3,590,121 | 6/1971 | Schiff et al. ..................... 424/50 |
| 3,701,830 | 10/1972 | Weinrich et al. ................. 424/94 |
| 3,882,036 | 5/1975 | Krezanowski et al. ............ 424/78 |
| 4,058,596 | 11/1977 | Nachtigal ......................... 424/50 |

FOREIGN PATENT DOCUMENTS

1033229   6/1986   United Kingdom .

OTHER PUBLICATIONS

*Diseases of the Cornea Treated with Papain,* Oftalmol. Zh., vol. 25, pp. 351-354, 1970.
*The Experience with the Usage of Papain in Opthalmology,* Oftal, Zh., vol. 26, pp. 542-543, 1971.
*Enzymatic Zonuloysis: A New Approach to the Surgery of Cataracts,* Staff Meetings of the Mayo Clinic, p. 179, Sep. 1959.
Highlights of "An Ophtholmologists' Symposium on the Soft Lens", British Journal of Ophthalmology, vol. 56, pp. 920-923, 1972.
*A New Treatment for Sloughing Wounds,* American Journal of Surgery, vol. L, No. 2, pp. 320-322, Nov., 1940.
ACLP Soft Lens Symposium, The Optician, pp. 26-28, Oct. 27, 1972.
Soft Lenses; Some Answers to Patient Questions, Optometric Weekly, pp. 1-23, Apr. 29, 1971.
Shpritz, *Problems Associated With Cleaning and Hyration of Contact Lenses,* The Optometric Weekly, vol. 52(20), pp. 973-975.
Burns et al., *Polident As A Contact Lens Cleaning Solution,* American Journal of Opthalmology, Feb. 1968, p. 251.
Lo et al., *Studies on Cleaning Solutions for Contact Lens,* Journal of the American Optometric Association, vol. 40, No. 11/Nov. 1969, pp. 1106-1109.
White, et al., *Principles of Biochemistry,* Second Edition, McGraw Hill Book Company, Inc., New York 1959, pp. 131-178; and pp. 217-271.
Hind et al., *Wetting and Hydration of Contact Lenses,* Contacto, The Contact Lens Journal, Mar. 1959, p. 68, lines 17-25.
"Use of Digestive Enzymes in Various Corneal Diseases," K. M. Illig, 1952.
"From the Editor's Desk," Contact Lens Society of America Journal, Apr. 1972.
"Through a Soft Lens Brightly," Medical World News, 2/18/72.
"Physiology, Pharmacology and Contact Lens," John P. F. Strachan, Australian Journal of Optometry, 1971.
"Papain as a Measure for the Struggle With Organization Processes in the Eye," G. L. Starkov, U. I. Savinykh, 1969.
"Papain Therapy of Eye Disease," G. L. Starkow, W. I. Sawinych, 1971.

*Primary Examiner*—Andrew Metz
*Attorney, Agent, or Firm*—Arnold, White & Durkee

[57] ABSTRACT

Proteinaceous material on the surface of contact lenses, especially soft contact lenses, may be removed by contacting the lens for a time sufficient to clean the lens with a substantially isotonic, aqueous solution containing an effective amount of a protease such as papain.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11 and 12 is confirmed.

Claim 5 is cancelled.

Claims 1 and 6 are determined to be patentable as amended.

Claims 2-4 and 7-10, dependent on an amended claim, are determined to be patentable.

New claim 13 is added and determined to be patentable.

1. A method for removing proteinaceous deposits from *soft* contact lenses comprising contacting a *soft* contact lens having proteinaceous deposits for a period of time sufficient to clean the lens with an aqueous solution comprising an effective cleaning amount of protease which is non-toxic to the eyes.

6. A method for removing proteinaceous deposits from soft contact lenses comprising contacting a soft contact lens having proteinaceous deposits for [about 1 minute] *a period of time sufficient to clean the lens up to about 48 hours* with an aqueous solution comprising *an effective cleaning amount of at least* about 0.01 [to about 5] percent of a protease which is non-toxic to the eyes.

13. *A method for removing proteinaceous deposits from hydrophilic or partially hydrophilic contact lenses comprising contacting a hydrophilic or partially hydrophilic contact lens having proteinaceous deposits for a period of time sufficient to clean the lens with an aqueous solution comprising an effective cleaning amount of protease which is non-toxic to the eyes.*

* * * * *